(No Model.) 5 Sheets—Sheet 3.
E. R. HOLMES.
PIANO.
No. 421,134. Patented Feb. 11, 1890.
Fig. 3.
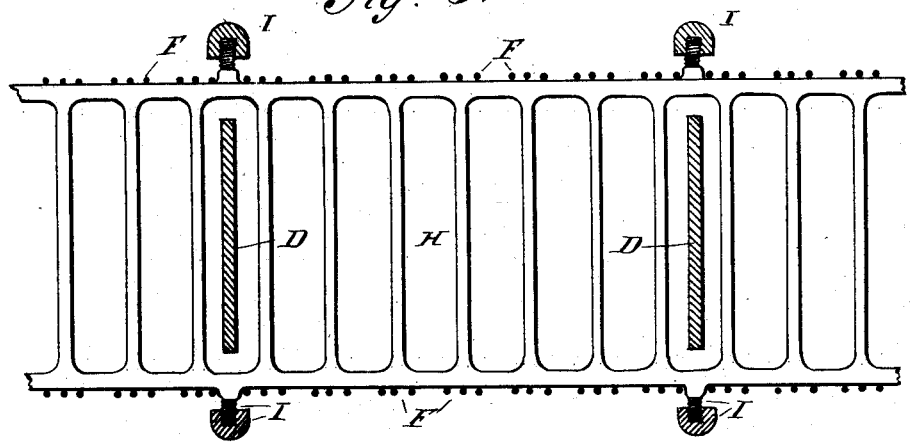
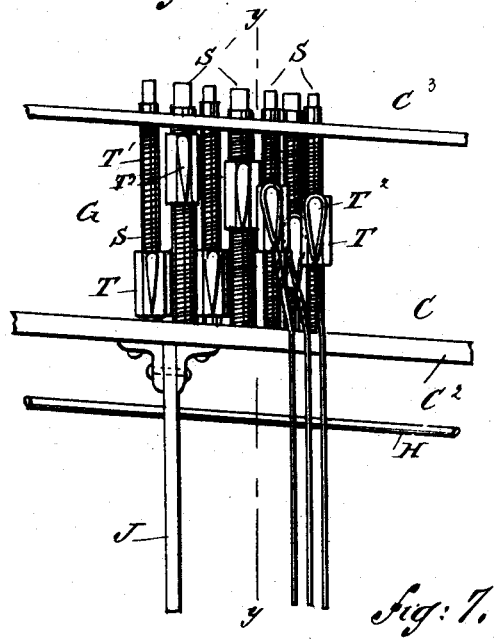
Fig. 5.
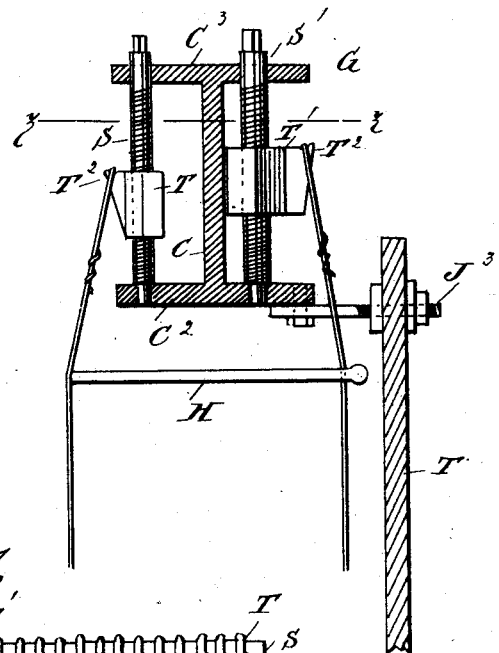
Fig. 6.
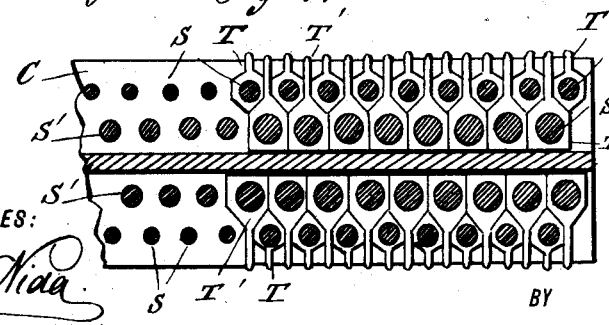
Fig. 7.
WITNESSES:
Chas. Nida
C. Sedgwick
INVENTOR:
E. R. Holmes
BY
Munn & Co.
ATTORNEYS.

(No Model.) 5 Sheets—Sheet 4.
E. R. HOLMES.
PIANO.
No. 421,134. Patented Feb. 11, 1890.
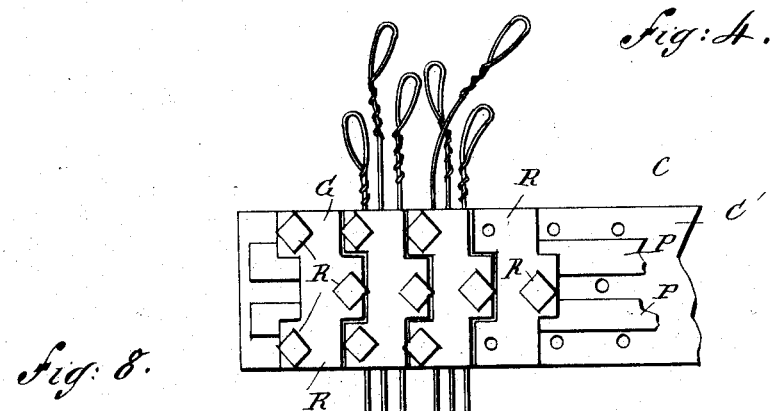
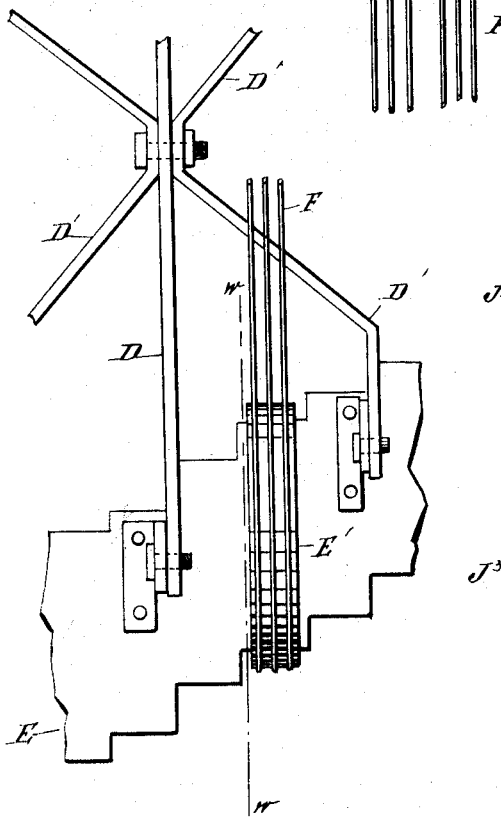
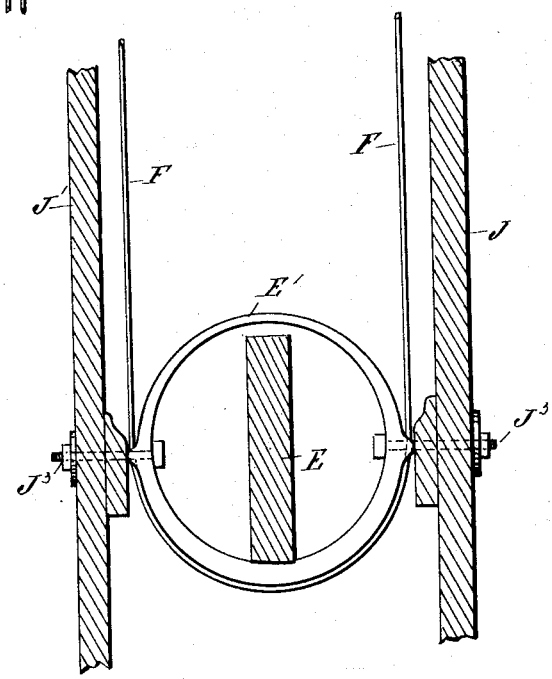

(No Model.) 5 Sheets—Sheet 5.

E. R. HOLMES.
PIANO.

No. 421,134. Patented Feb. 11, 1890.

WITNESSES:
Chas. Nida
C. Sedgwick

INVENTOR:
E. R. Holmes
BY
Munn & Co.
ATTORNEYS.

UNITED STATES PATENT OFFICE.

EDMUND RICHARD HOLMES, OF TOKIO, JAPAN.

PIANO.

SPECIFICATION forming part of Letters Patent No. 421,134, dated February 11, 1890.

Application filed August 30, 1889. Serial No. 322,474. (No model.)

*To all whom it may concern:*

Be it known that I, EDMUND RICHARD HOLMES, a British subject, at present residing in Tokio, Japan, have invented new and useful improvements in Pianos, of which the following is a full, clear, and exact description.

The object of the invention is to provide certain new and useful improvements in pianos, whereby the contraction and expansion of the strings are reduced to a minimum, so that the strings once tuned will retain their note without variation.

The invention consists in an improved construction of bridges for the strings of a piano, and in the arrangement of said parts, as hereinafter set forth.

Reference is to be had to the accompanying drawings, forming a part of this specification, in which similar letters of reference indicate corresponding parts in all the figures.

Figure 1:
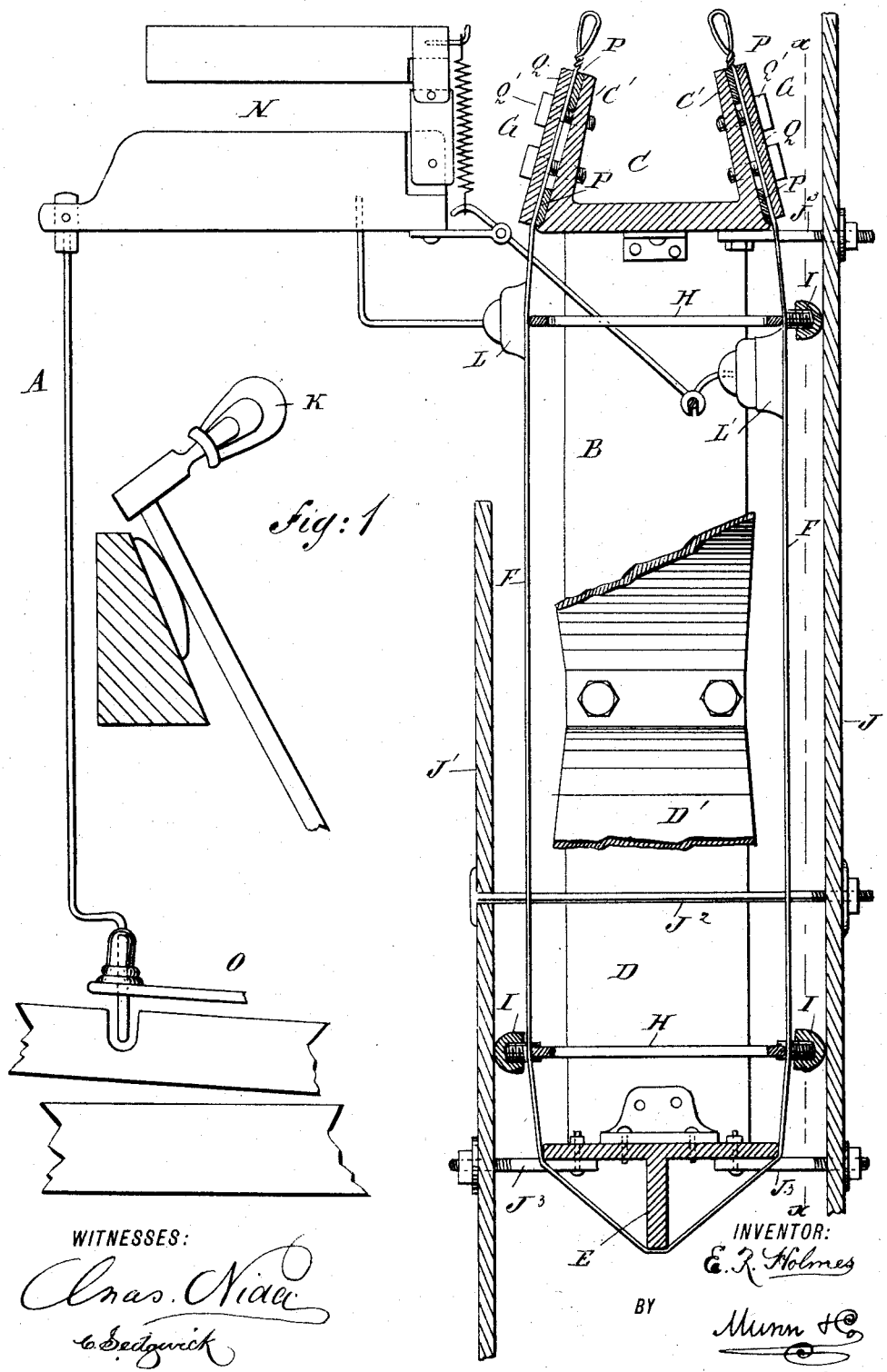
Figure 2:
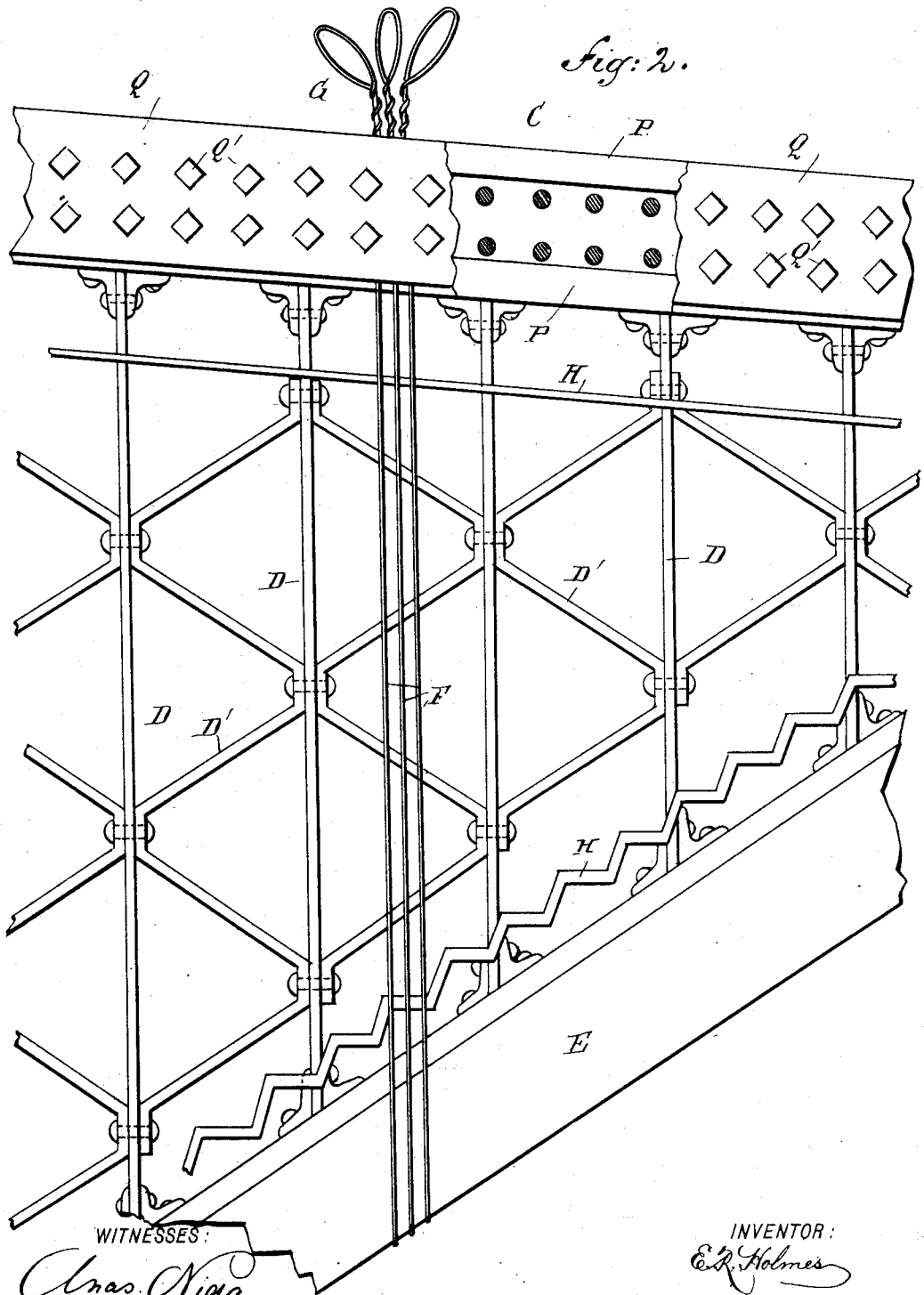
Figure 10:
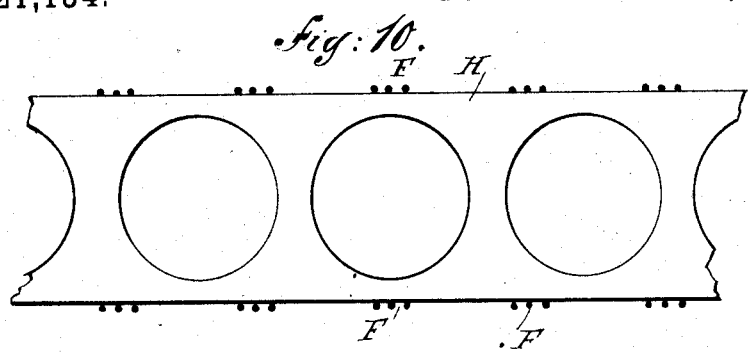
Figure 11:
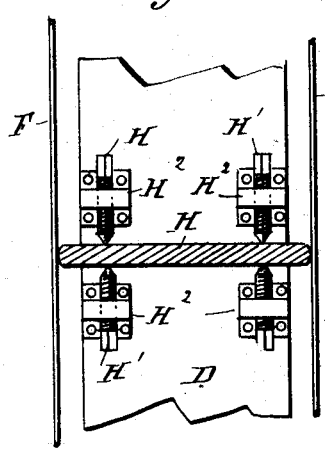
Figure 12:
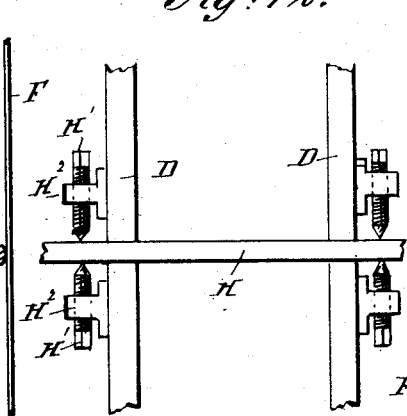
Figure 13:
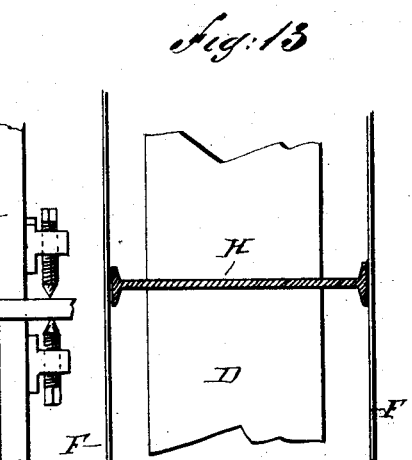
Figure 14:
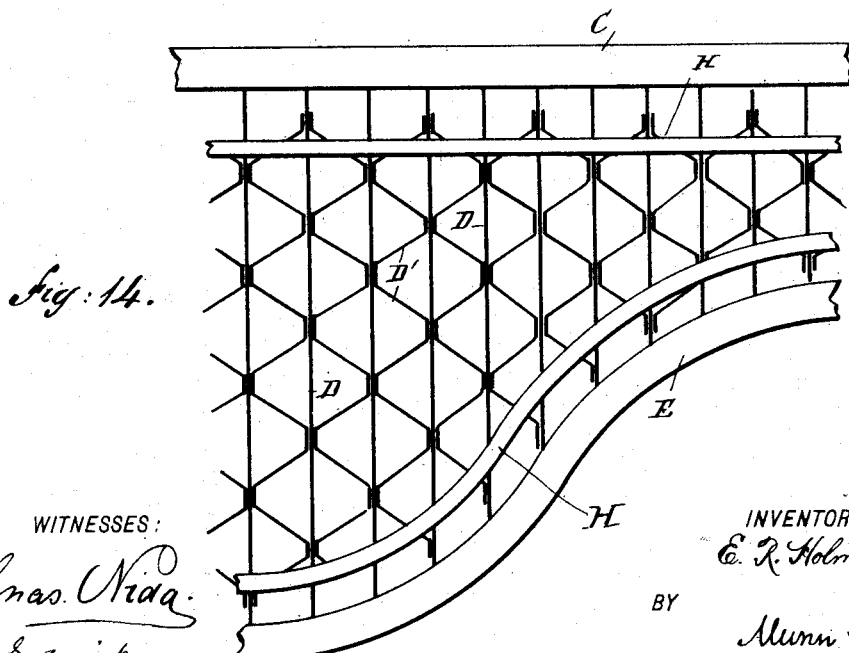

Figure 1 is a sectional end elevation of the improvement as applied to an upright piano. Fig. 2 is a sectional side elevation of the same, with parts removed and parts broken out. Fig. 3 is a plan view of one of the bridges, with the strings and other adjacent parts in section. Fig. 4 is a front view of a modified form of the fastening for the ends of the strings. Fig. 5 is a like view of still another modified form of fastening for the ends of the strings. Fig. 6 is a transverse section of the same on the line $y\ y$ of Fig. 5. Fig. 7 is a sectional plan view of the same on the line $z\ z$ of Fig. 6. Fig. 8 is a front view of a modified form of one of the head-rails. Fig. 9 is a transverse section of the same on the line $w\ w$ of Fig. 8. Fig. 10 is a plan view of a modified form of bridge. Fig. 11 is a front view of a support for the bridge, which latter is shown in section. Fig. 12 is a side elevation of the same. Fig. 13 is a sectional elevation of a modified form of bridge, and Fig. 14 is a side elevation of the frame and bridges.

The piano A is provided with an improved frame B, provided with a head-rail C, connected by a number of stays D with a second head-rail E, extending obliquely to the head-rail C. A number of braces D' connect the several stays D, so as to strengthen the frame. Each string F is fastened at one end to one side of the head-rail C, then passed over the head-rail E, and back to the side of the head-rail C, so as to form two parallel strings placed in line with each other and such a distance apart that when one string is sounded the other vibrates in sympathy with it. The ends of each string F are secured by suitable clamps G to the head-rail C.

Between the front and rear parts of the strings are placed one or two bridges H, each consisting of a light frame, such as shown in Figs. 3 and 10, over the front and rear edges of which pass the strings. The skeleton bridges have a series of parallel openings, through which the frame B passes, being, however, held out of contact with the same. Each of the bridges may be supported and secured in place by bolts or set-screws H' screwing in nuts $H^2$, secured on the stays D of the frame B, as plainly shown in Figs. 11 and 12. The edges of the bridges are preferably rounded, but may be formed in the shape of T, as plainly shown in Fig. 13. The distance the string F extends between two bridges on one bridge and the frame determines the quality of the note by limiting the vibrations at touch. One of the bridges is consequently made straight and the other either in step form, as shown in Fig. 2, or curved, as illustrated in Fig. 14, so that the two bridges are near each other at one end and farther apart at the other end. Each of the bridges is provided on its edges with buttons I, resting against the sounding-boards J and J', respectively, located in the front and rear of the strings F, and is plainly shown in Fig. 1. The sounding-boards J and J' are connected with each other by suitable stays $J^2$, and the head-rails C and E are connected with the said sounding-boards by bolts $J^3$, so as to connect the sounding-boards, the heads, and the bridges together.

On the inner part of each string or set of strings operates the hammer K, connected in the usual manner with the respective key on the key-board. This device is of any approved construction, and no further reference is deemed necessary. The inner sounding-board J' is cut away on top sufficiently to permit a free movement of the hammer K to and from the inner part of the string. (See Fig. 1.) Both parts of each string can be damped simultaneously by the dampers L and L', connected by a suitable mechanism N with the pedals O. When a pedal O is operated, the mechanism N throws both dampers L and L' simultaneously onto the front and rear parts of the strings.

As illustrated in Fig. 1, the head-rail E is made T-shaped in cross-section, each string being first passed over the transverse bar, then over the end of the central portion, and then over the other end of the transverse bar, as is plainly shown in Fig. 1. The transverse bar is somewhat less in width than the width of the next bridge H, so that all the tension of the string is between the two bridges H.

Instead of forming the head-rail E in the shape shown and just described, it may be made of a flat beam having steps, as shown in Fig. 8, and on each set of steps is a ring E', over each of which is passed one or a set of strings F, as illustrated in Figs. 8 and 9. The rings E' are secured by the bolts $J^3$ to the sounding-boards J and J'.

The head C (illustrated in Fig. 1) is made U-shaped in cross-section, the ends C' being slightly inclined toward each other. Each fastening device G, as illustrated in Figs. 1 and 2, is provided with two longitudinally-extending bars P, placed on the respective end C' of the head C, and then the ends of the strings are passed over the said bars P, and on top of the strings is then placed a plate Q, screwed onto the strings by suitable set-screws Q', so as to clamp the strings between the said plate Q and the bars P.

In the modification shown in Fig. 4 the plate Q is dispensed with, and small plates R are employed, of which one plate is for one or a set of strings and is screwed onto the end C' by set-screws R. By this means one or a set of strings may be adjusted irrespective of the others.

In the modification shown in Figs. 5 and 6 the head C is made in double-T form in cross-section, the bottom and top $C^2$ and $C^3$ supporting at the front and rear sets of screw-rods S and S', mounted to turn in the said bottom and top $C^2$ and $C^3$. On the screw-rods S and S' screw the nuts T T', preferably of the shape shown in Fig. 7, each provided on its front end with a projecting lug $T^2$, on which the loops on the ends of the strings are hooked after leaving the top bridge H. The sides of the successive nuts T and T' fit against each other, so that the nuts are guided vertically up and down when the respective screw-rod S or S' is turned by a key or other device fitted on the square end of the top. By this means the operator is enabled to tune each string at its front and rear parts at any time.

The frames B are proportioned according to the length of the strings, so that that part of the frame which supports the bass strings is wider than that part sustaining the treble strings. By the especial construction of the frame considerable material is saved, and at the same time the stability and the resisting-power of the frame are increased.

It will be understood that when one string or set of strings is stretched to give the required vibration the force of the strain is exerted exactly along the median line between the two lengths of string. By this system of stringing the quantity of material required in a frame is reduced to a minimum, and full-toned pianos weigh but a fraction of any of the pianos now in use, so that the piano is rendered very light and portable.

The bridges H are held in position free of the vertical frame, and the vibrations of the strings imparted to the latter are conveyed to the sounding board or boards, and clear notes are obtained. The frame B, being a separate part of the piano, the sounding-board may be made in any shape or of any thickness.

What I claim is—

In a piano, the combination, with the sounding-board and the bridges H, having openings, as specified, means for supporting the bridges, of the frame B, passing through said openings, and the strings arranged on each side of the bridges and exerting equal tension and pressure, as shown and described, for the purpose specified.

EDMUND R. HOLMES.

Witnesses:
 JAMES J. PEARSON,
*Consulting Engineer and Contractor, 32 Settlement, Yokohama.*
 JOHN McDONALD,
*Railway Dept., Tokio.*